(12) United States Patent
Osborn et al.

(10) Patent No.: US 8,149,849 B2
(45) Date of Patent: Apr. 3, 2012

(54) ZIGBEE/IP GATEWAY

(75) Inventors: William Richard Osborn, Cary, NC (US); Jesse W. Bennett, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1095 days.

(21) Appl. No.: 11/468,925

(22) Filed: Aug. 31, 2006

(65) Prior Publication Data

US 2008/0056261 A1     Mar. 6, 2008

(51) Int. Cl.
*H04L 12/56* (2006.01)
(52) U.S. Cl. ............................................. 370/401
(58) Field of Classification Search .................. None
See application file for complete search history.

(56) References Cited

U.S. PATENT DOCUMENTS

| | | | |
|---|---|---|---|
| 6,775,258 B1* | 8/2004 | van Valkenburg et al. | 370/338 |
| 7,733,885 B2* | 6/2010 | Ayyagari et al. | 370/401 |
| 2001/0010061 A1* | 7/2001 | Matsumoto | 709/249 |
| 2002/0027569 A1* | 3/2002 | Manni et al. | 345/764 |
| 2002/0045424 A1* | 4/2002 | Lee | 455/41 |
| 2002/0163895 A1 | 11/2002 | Haller et al. | |
| 2002/0196771 A1* | 12/2002 | Vij et al. | 370/349 |
| 2003/0061110 A1* | 3/2003 | Bodin | 705/26 |
| 2005/0193249 A1* | 9/2005 | Poustchi et al. | 714/13 |
| 2006/0067209 A1* | 3/2006 | Sheehan et al. | 370/216 |
| 2006/0090165 A1* | 4/2006 | Martin et al. | 719/318 |
| 2007/0030848 A1 | 2/2007 | Miyata et al. | |
| 2007/0097993 A1* | 5/2007 | Bojahra et al. | 370/401 |
| 2007/0115934 A1* | 5/2007 | Dauster et al. | 370/352 |
| 2008/0069121 A1* | 3/2008 | Adamson et al. | 370/401 |
| 2008/0205419 A1* | 8/2008 | Shin et al. | 370/401 |
| 2009/0070431 A1* | 3/2009 | Malik et al. | 709/206 |
| 2009/0178142 A1* | 7/2009 | Lieblich et al. | 726/25 |
| 2009/0296642 A1* | 12/2009 | Keller et al. | 370/329 |

FOREIGN PATENT DOCUMENTS

| | | |
|---|---|---|
| DE | 10245760 A1 | 4/2004 |
| JP | 2004236096 A | 1/2003 |
| WO | 2004/015927 A1 | 2/2004 |

OTHER PUBLICATIONS

Louati, Wajdi and Djamal Zeghlache, "Network-Based Virtual Personal Overlay Networks Using Programmable Virtual Routers," IEEE Communications Magazine, Jul. 2005, pp. 86-94, vol. 43, No. 8, IEEE Service Center, Piscataway, NJ, US.

(Continued)

*Primary Examiner* — Chirag Shah
*Assistant Examiner* — Amar Persaud
(74) *Attorney, Agent, or Firm* — Coats & Bennett, P.L.L.C.

(57) ABSTRACT

A gateway enables communications between a personal area network, such as a Zigbee network, and an Internet Protocol (IP) network. The gateway includes a first interface device for connecting to the personal area network, a second interface device for connecting to the IP network, and a gateway controller. In one embodiment, the gateway controller allocates ports on an IP interface to one or more clients in said personal area network, stores a routing table in memory for relating said clients in said personal area network with their corresponding ports, and transfers messages between said personal area network clients and said IP network based on entries in said routing table. In other embodiments, the gateway may function in conjunction with a gateway proxy.

26 Claims, 18 Drawing Sheets

OTHER PUBLICATIONS

International Search Report and Written Opinion, International Application No. PCT/US2007/065396, Date of Mailing: Feb. 1, 2008.
ZigBee Alliance Gateway Stack Diagram, ZigBee™ Alliance Wireless Control That Simply Works, Copyright 2004.
Invitation to Pay Additional Fees, International Application No. PCT/US2007/065396, Mailing Date: Dec. 7, 2007.
Anonymous: "Cirronet ZG-2400E Ethernet Gateway" [Online] Jan. 2006, XP002456479; Retrieved from the Internet: URL:http://www.tekmodul.de/fileadmin/Redakteure/pdf/Gateway_ZG-2400E.pdf>.
S. Sakane, Y. Ishii, K. Toba, K. Kamada, N. Okabe: "A translation method between 802.15.4 and IPv6 nodes" [Online] Jan. 21, 2006, Retrieved from the Internet: URL:http://www.taca.jp/docs/saint2006/saint06-ws.pdf>.
Kuwahara, Jungo et al, "Design of Remote USB Device Control with Plural Terminals", Proceedings of Multimedia Distributed, Cooperative, and Mobile (DICOMO) Symposium 1997-2006 Ver. 1.1 [DVD-ROM], Information Processing Society of Japan, Jul. 5, 2006, vol. 2006, pp. 685-688.
Emori, T., "Coodrination system between protocols for information home appliances DLNA, UPnP and a sensor network Zigbee", IEICE Technical Report vol. 105, No. 409, Japan, The Institute of Electronics, Information and Communication Engineers, Nov. 10, 2005, vol. 105.

* cited by examiner

| PRESENCE | STATE | CLIENT ID | PORT | TYPE |
|---|---|---|---|---|
| TRUE | CONNECTED | NODE 1 | PORT 1 | LIGHT |
| FALSE | - | NODE 2 | PORT 2 | SENSOR |
| TRUE | CONNECTED | NODE 3 | PORT 3 | SWITCH |
| TRUE | CONNECTED | NODE 4 | PORT 4 | LIGHT |
| TRUE | DISCONNECTED | NODE 5 | PORT 5 | SENSOR |

| MESSAGE TYPE | MESSAGE PARAMETERS | DATA |

*FIG. 18*

ZIGBEE/IP GATEWAY

BACKGROUND OF THE INVENTION

The present invention relates generally to the field of personal area networks (PANs) and, more particularly, to a method for connecting a personal area network to an IP-based network.

Zigbee is a wireless networking standard for low power, low data rate, and lost cost applications. Zigbee is well suited for automation, control, monitoring, and sensing applications in which data is transmitted infrequently at low rates from battery-powered devices. The Zigbee protocol builds upon the Institute of Electrical and Electronics Engineers (IEEE) 802.15.4 standard. This IEEE standard defines a short range, low power, low data rate wireless interface for small devices that have constrained power, CPU, and memory resources.

Zigbee is an open standard with broad industry support. Because of the open standard, Zigbee devices made by different manufacturers will inter-operate. The Zigbee protocol allows ad hoc networking so that devices can be easily added and removed from existing networks. For these reasons, Zigbee technology is expected to emerge as one of the leading technologies for machine-to-machine (M2M) applications.

To realize the full potential of Zigbee technology, it will be necessary to enable Zigbee devices residing in a personal area network to communicate with other devices connected to I P networks.

SUMMARY OF THE INVENTION

The present invention relates to communications between diverse networks, such as a Zigbee personal area network, and an IP network. The gateway includes a first interface device for connecting to the IP network, a second interface device for connecting to the Zigbee network, and a gateway controller. The gateway controller routes messages between the IP network and the Zigbee network.

In one exemplary embodiment, the gateway controller allocates ports on the IP interface device to clients in the Zigbee network. The gateway controller maintains a routing table associating the assigned ports with their corresponding Zigbee clients. The routing table may, for example, include a network address for the Zigbee clients and the corresponding port. When a message arrives at the gateway from the IP network, the port on which the message arrived is used to look up the network address of the corresponding Zigbee client. Conversely, messages from Zigbee clients are output to corresponding ports based on the network address of the originating Zigbee client.

In some embodiments, the gateway may operate in conjunction with a gateway proxy that assigns ports to Zigbee clients and maintains the routing tables.

In another embodiment, the gateway controller includes a node manager that can create Zigbee agents responsive to requests from IP clients. The Zigbee agents provide a presence on the Zigbee network for the requesting IP clients. The Zigbee agents appear like any other Zigbee application to Zigbee clients. The Zigbee agents can be remotely configured and controlled by the IP clients.

DETAILED DESCRIPTION OF THE DRAWINGS

FIG. 6 illustrates an exemplary routing table used by the gateway.

FIG. 7A illustrates a procedure for sending a message from an IP client to a gateway.

FIG. 18 illustrates a message format for serial communications.

DETAILED DESRIPTION OF THE INVENTION

Figure 1:
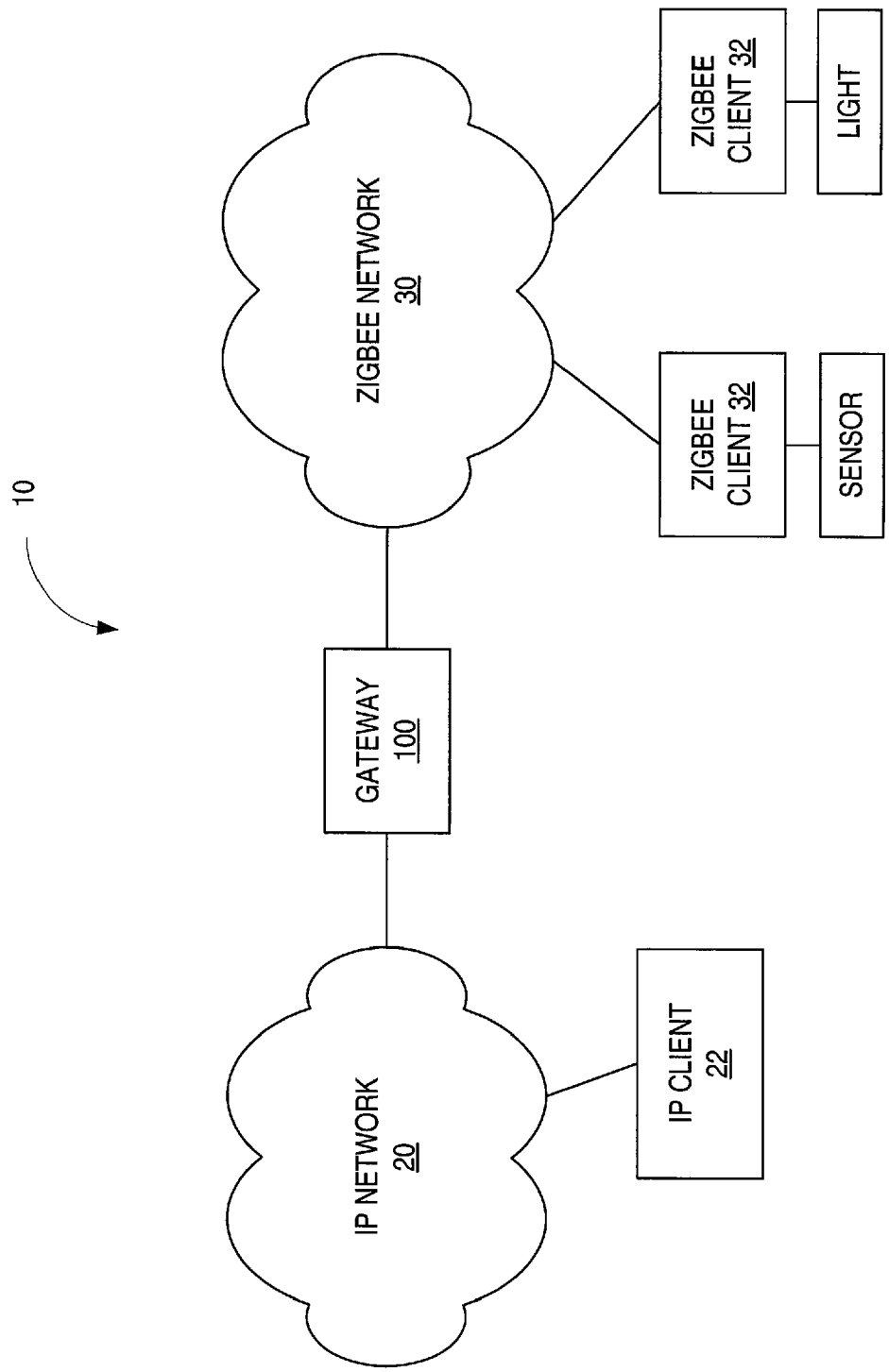
FIG. 1 illustrates an exemplary communication network including an IP network and a Zigbee personal area network.

Referring now to the drawings, one exemplary embodiment of a communication network 10 according to the present invention is shown in FIG. 1. The communication network 10 comprises an IP network 20 to which an IP client 22 is attached, and a Zigbee network 30 with one or more Zigbee clients 32. The Zigbee standard specifies protocols for a personal area network (PAN) and is well suited for sensing, automation, and control applications. The present invention, however, may be used with other types of PANs and is not limited to Zigbee networks. A gateway 100 connects the Zigbee network 30 with the IP network 20 and allows IP clients 22 residing in the IP network 20 to communicate with Zigbee clients 32 in the Zigbee network 30. Zigbee clients 32 can be used to control devices such as lights, sensors, etc.

Figure 2:
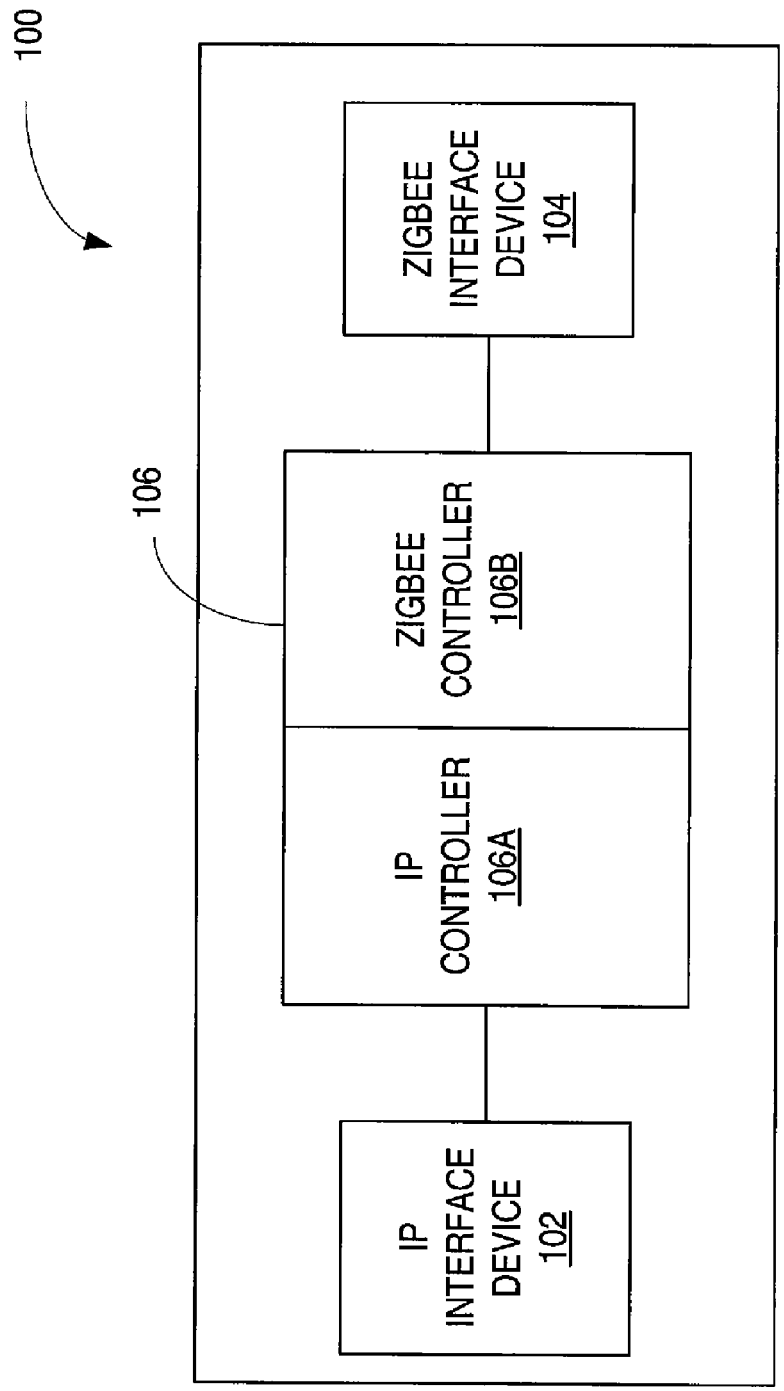
FIG. 2 illustrates an exemplary gateway between a Zigbee personal area network and an IP network.

FIG. 2 illustrates an exemplary gateway 100. The gateway 100 includes an IP interface device 102 for interfacing with the IP network 20, a Zigbee interface device 104 for interfacing with the Zigbee network 30, and a gateway controller 106. The IP interface device 102 may comprise, for example, an Ethernet adapter, IEEE 802.11.x wireless interface adapter, or cellular transceiver. The Zigbee interface device comprises an IEE 802.15.4 wireless interface adapter. The gateway controller 106 includes an IP controller 106A to control the IP interface device 102 and a Zigbee controller 106B to control the Zigbee interface device 104. The gateway controller 106 may be implemented as software on one or more programmable processors with associated memory, either internal or external, for storing data and applications needed for operation.

The Zigbee standard is built upon the Institute of Electrical and Electronics Engineers (IEEE) 802.15.4 standard that defines a short-range, low-power, low-data rate wireless interface for small devices with limited power, CPU, and memory resources. The Zigbee standard comprises a set of network and application-level protocols to enable networking between Zigbee clients 32. The Zigbee clients 32 comprise nodes within the Zigbee network 30. There are three types of nodes: coordinator, router, and end device. The various nodes may be interconnected in a star topology, tree topology, or mesh topology. Regardless of the network topology, each Zigbee network 30 comprises one (and only one) coordinator. The coordinator is responsible for setting up and managing the Zigbee network 30 to which the other nodes may join. In some embodiments, the coordinator may also maintain binding tables for routing of messages between various nodes of the Zigbee network 30.

A Zigbee network 30 that uses a tree or mesh topology requires the presence of at least one router. The router relays messages from one node in the Zigbee network 30 to another and allows child nodes to connect to it. A router acts as a local coordinator for end devices joining the Zigbee network 30. End devices typically host one or more applications to perform specified tasks. For example, end devices may have applications to collect and report data, and to control home devices such as lights within the home.

Within a Zigbee network 30, each node is identified by a unique address. Zigbee networks 30 employ two addressing schemes. Each node has a long address and a short address. The long address, also called the IEEE address or MAC address, is a 64-bit address allocated by the IEEE, which uniquely identifies the node. The short address, also referred to as the network address, is a 16-bit address that identifies the nodes of the Zigbee network 30 to the network coordinator. Network addresses are allocated by a coordinator or router when a node joins the Zigbee network 30.

A node may host one or more user applications. For example, there may be one application in the network 30 to monitor temperature and humidity. Such applications are referred to as endpoints on the node. These applications may send and receive messages to other applications either inside or outside of the Zigbee network 30.

In order to direct messages arriving at a node to the appropriate application, each endpoint is identified by an endpoint address. Endpoint addresses are similar to ports in IP addresses. A client 32 may have up to 240 applications or endpoints numbered from 1-240. Endpoint 255 is a broadcast endpoint address. Messages addressed to endpoint 255 will be delivered to all applications on the node.

Applications are modeled as application objects. An application profile defines the interactions between related or complementary application objects. An application profile may be public or private. A public application profile enables devices from different vendors to interoperate. Private application profiles are proprietary. The Zigbee Alliance provides a number of public profiles. One such public profile is the Home Control, Lighting Profile, which focuses on sensing and controlling light levels in a home environment. The profile defines a number of devices including Light Sensor Monochromatic, Switch Remote Control, Switching Load Controller, and Dimmer Remote Control.

Application objects communicate with one another through object attributes and clusters. An object attribute is a data item that is communicated between application objects. Each attribute has its own unique identifier. The Zigbee standard defines a set of data types for object attributes. A grouping of attributes comprises a cluster, which also has its own unique identifier. Attributes within a cluster may be mandatory or optional. Each cluster can contain up to $2^{16}$ attributes. Input clusters consist of attributes that can be sent by other application objects. For example, an application object for monitoring a sensor may have an attribute called "report time" which controls the time interval between sensor readings. Output clusters comprise attributes that supply data to other application objects. Application objects with complementary input and output clusters can communicate with one another.

Application objects can initiate communications through a process known as binding. Binding creates a logical link between application objects. The binding mechanism associates applications that generate information with applications that can use the information. The information is exchanged as clusters. In order for two application objects to be bound, they must have complementary input and output clusters. When two application objects bind, the output cluster of one application object is connected with the input cluster of another application object. The binding between two application objects is specified by the network address and endpoint of the application object where the cluster is generated (the source), the network address and endpoint of the application object that consumes the cluster (the destination), and the cluster ID for the cluster being sent between them. Bound application objects can send and receive messages using the MSG and KVP message services.

Depending on where the binding information is stored, transmission of the cluster information from source to destination is direct or indirect. With direct addressing, the node sending the information determines the network address for the node where the destination application object resides and inserts the destination address into the message. If multiple application objects at different nodes receive the message, the message is replicated and a copy is sent to each node where at least one destination application object resides. With indirect addressing, the output cluster is sent to the coordinator, which maintains the binding tables. The coordinator determines the destination node based on the source address of the sending node and the cluster ID. The coordinator finds all entries in its binding table containing the source cluster and application address and generates a message for each receiving node. For each message, the coordinator inserts the destination address from the binding table into the message.

The Zigbee standard includes a discovery mechanism that enables Zigbee clients 32 in the network to discover the address and capabilities of other clients 32. Device discovery enables Zigbee clients 32 to query the network 30 to discover the network addresses of other clients on the network. Service discovery allows a Zigbee client 32 to request information about the capabilities of another Zigbee client 32. Service information is stored as descriptors and may include information such as the device type and capabilities of the Zigbee client 32, and the types of applications running on the Zigbee client 32. There are three mandatory descriptors and two optional descriptors stored in a Zigbee client 32. The mandatory descriptors are the node, node power, and simple descriptors. The optional descriptors are called the complex and user descriptors. For each Zigbee client 32, there is only one node and node power descriptor. For each application attached to an endpoint, there is a simple descriptor and possibly a complex descriptor and/or user descriptor.

The node descriptor describes the type (i.e., coordinator, router, or end device) and capabilities of the Zigbee client 32.

The capabilities of a Zigbee client 32 or node are properties such as the frequency band in use, and the maximum buffer size. The power descriptor contains information about how the client 32 is powered. Such information may include the power mode (i.e., whether the device is on at all times or wakes up periodically), the available power sources, the current power sources in use, and the current power source level. The simple descriptor contains information about an application attached to the endpoint of a Zigbee client 32. This information includes the endpoint address that the application resides on, the application profile that the application implements, and lists of input and output clusters supported. The simple descriptor also indicates whether there are corresponding complex and user descriptors.

Figure 3:
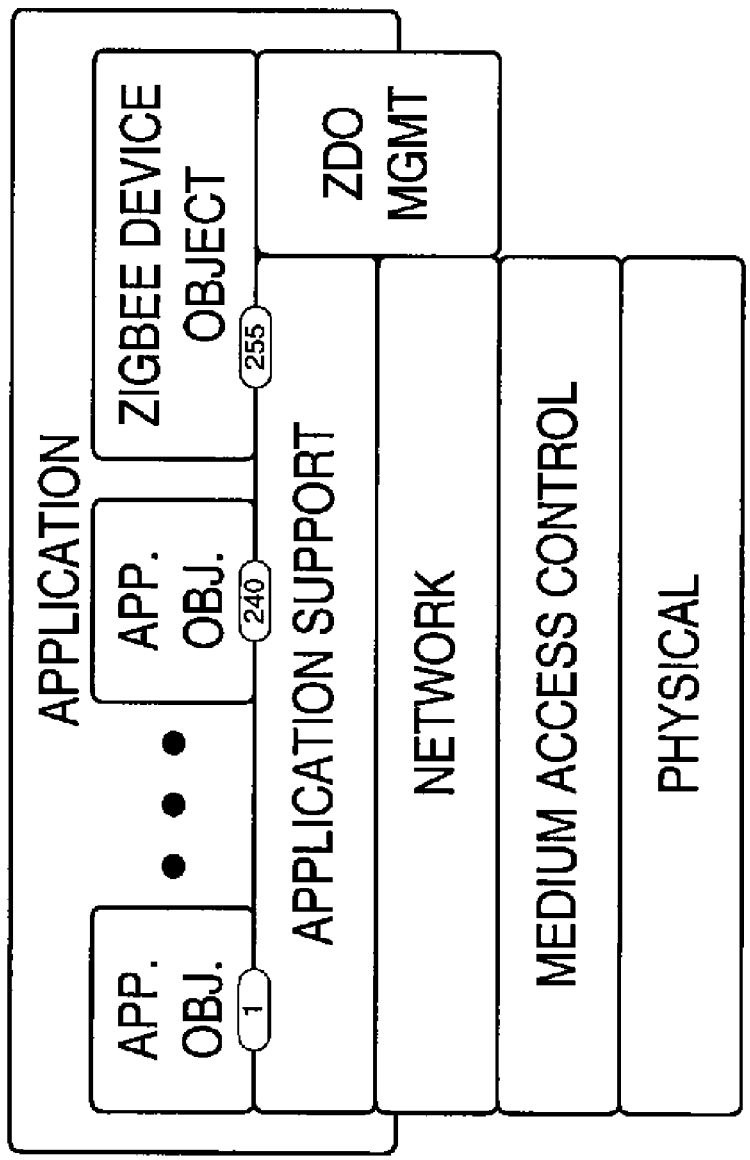
FIG. 3 illustrates a standard Zigbee protocol stack.

FIG. 3 illustrates a Zigbee protocol stack, which is built on top of the Institute of Electrical and Electronics Engineers (IEEE) 802.15.4 radio communication standard. The IEEE standard specifies a short-range radio interface for communication over a radio channel. The IEEE standard includes a specification for the physical layer and medium access control (MAC) layer of the protocol stack. The Zigbee standard defines a set of network layer and application layer protocols (referred to herein collectively as the Zigbee stack or Zigbee protocols) to support user applications. The network layer defines mechanisms for joining and leaving a network and for sending messages to the appropriate destination. The network layer also provides mechanisms for device and service discovery. These mechanisms allow Zigbee nodes to discover other nodes in the network and the capabilities of such nodes. The network layer also manages the formation of the Zigbee network and assigns addresses to devices that join the network.

The application layer includes an application framework (AF), an application support sublayer (APS), and the Zigbee device object. The application framework provides an interface between the applications and the APS. The APS implements a binding mechanism to create logical associations between application objects. When a message arrives at a Zigbee client 32, the APS is responsible for delivering the message to the appropriate application. The Zigbee device object (ZDO) represents the Zigbee node type of the device (e.g., coordinator, router, or end device). The Zigbee device object also initiates device and service discovery on the Zigbee network 30.

The Zigbee protocols allow two or more Zigbee clients 32 within the same Zigbee network 30 to communicate with one another. However, the Zigbee protocols do not provide a mechanism to enable a Zigbee client 32 to communicate with IP clients 22 in an IP network 20. The present invention provides a gateway function to facilitate such communications.

Figure 4:
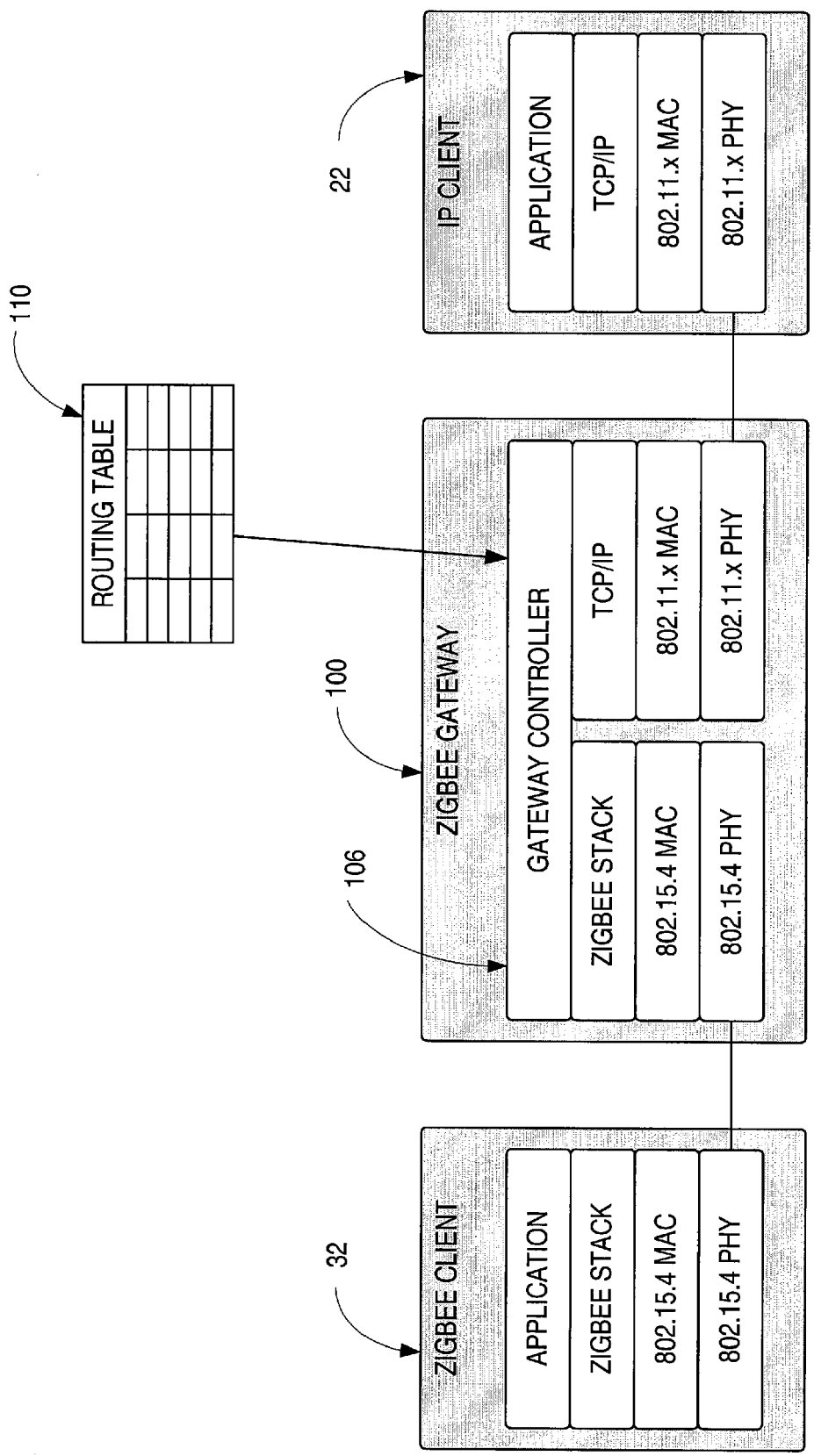
FIG. 4 illustrates an exemplary implementation of a gateway between a Zigbee personal area network and an IP network.

FIG. 4 illustrates an exemplary gateway 100 according to one embodiment of the invention. Gateway 100 includes both a Zigbee stack and a TCP/IP stack. The Zigbee stack is a conventional Zigbee stack implemented over the IEE 802.15.4 interface. The TCP/IP stack also enables the gateway 100 to also communicate with IP clients 22 in the IP network 20. Because gateway 100 implements the Zigbee stack, the gateway 100 can join the Zigbee network 30 and communicate with other Zigbee clients 32. To Zigbee clients 32, the gateway 100 looks like any other Zigbee client 32 and functions according to the Zigbee standards. Applications that reside on Zigbee clients 32 and that share the same Profile ID with gateway controller 106 can communicate with the gateway 100 using standard Zigbee messages.

Figure 5:
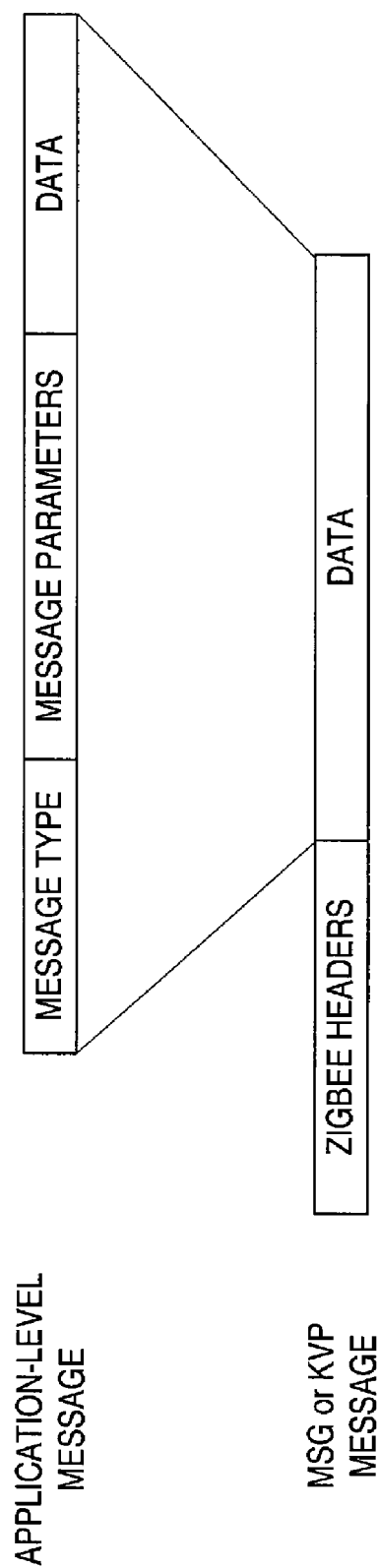
FIG. 5 illustrates a message format for communication with the exemplary gateway.

An application residing on a Zigbee client 32 may use standard MSG or KVP messages to communicate with the gateway 100. For communications between the Zigbee client 32 and the gateway 100, one CID (e.g., CID=1) is used for data messages (data that is being sent or received). A second CID (e.g., CID=2) is used for control messages. When the Zigbee client 32 wants to send data, it sends a MSG or KVP message to the gateway 100 with the CID set equal to "1." The data field contains the data to be transmitted. Similarly, the gateway 100 uses CID=1 to forward data from an IP client 22 to the Zigbee client 32. The Zigbee client and gateway may use CID=2 to send control messages. Alternatively, application layer messages can be encapsulated into standard Zigbee messages as shown in FIG. 5. The message format for the application layer messages includes a message type field, one or more message parameter fields, and a data field. The message type field indicates the type of the message. The message parameter fields provide required parameters for the message type. The data field contains the message data.

Gateway 100 is responsible for maintaining connections with IP network 20 and for transferring messages between Zigbee clients 32 and IP clients 22 in the IP network 20. The gateway 100 maintains logical relationships between IP clients 22 in the IP network 20 and Zigbee clients 32 in the Zigbee network 30. These logical relationships may be maintained, for example, in a routing table 110 stored in the memory of gateway 100. The gateway 100 assigns each Zigbee client 32 a unique IP port at the gateway IP address. For each Zigbee client 32, routing table 110 stores the MAC address or short address and corresponding port number. When messages arrive at gateway 100, the gateway 100 uses the routing table 110 to determine where to forward the message. Data arriving at a particular port from the IP network 20 is sent to the Zigbee client 32 identified by the corresponding MAC address or short address stored in routing table 110. Similarly, when a message arrives at the gateway 100 from a Zigbee client 32 in the Zigbee network 30, gateway 100 determines the MAC address or short address of the originating node and outputs the data to the corresponding port identified in the routing table 110.

FIG. 6 illustrates an exemplary implementation of the routing table 110. Routing table 110 includes five fields: presence, state, client ID, port, and type. The client ID field identifies a particular Zigbee client 32 in the Zigbee network 30. This field may contain, for example, the MAC address or short address of the Zigbee client 32. The port field contains the port number for the port allocated to the Zigbee client 32. The type field indicates a device type of the Zigbee client 32. The device type indicates the type of device that is controlled by the Zigbee client 32. For example, a Zigbee client 32 may control multiple devices and therefore may have more than one device type. In this case, the Zigbee client 32 may have more than one entry in the routing table 110. An IP client 22 may send a query to gateway 100 to obtain a list of Zigbee clients 32 with a specified device type and corresponding port numbers. The client ID, port and type fields are normally persistent and provisioned at the time the gateway 100 is established.

The presence and state fields contain state information pertaining to a Zigbee client 32. The presence field indicates whether a node is detected by the gateway 100. This field may be set to TRUE when the node is detected and FALSE otherwise. The state field indicates the current state of the port. The state is "connected" when an IP client 22 is connected to the port and "disconnected" otherwise.

Figure 7:
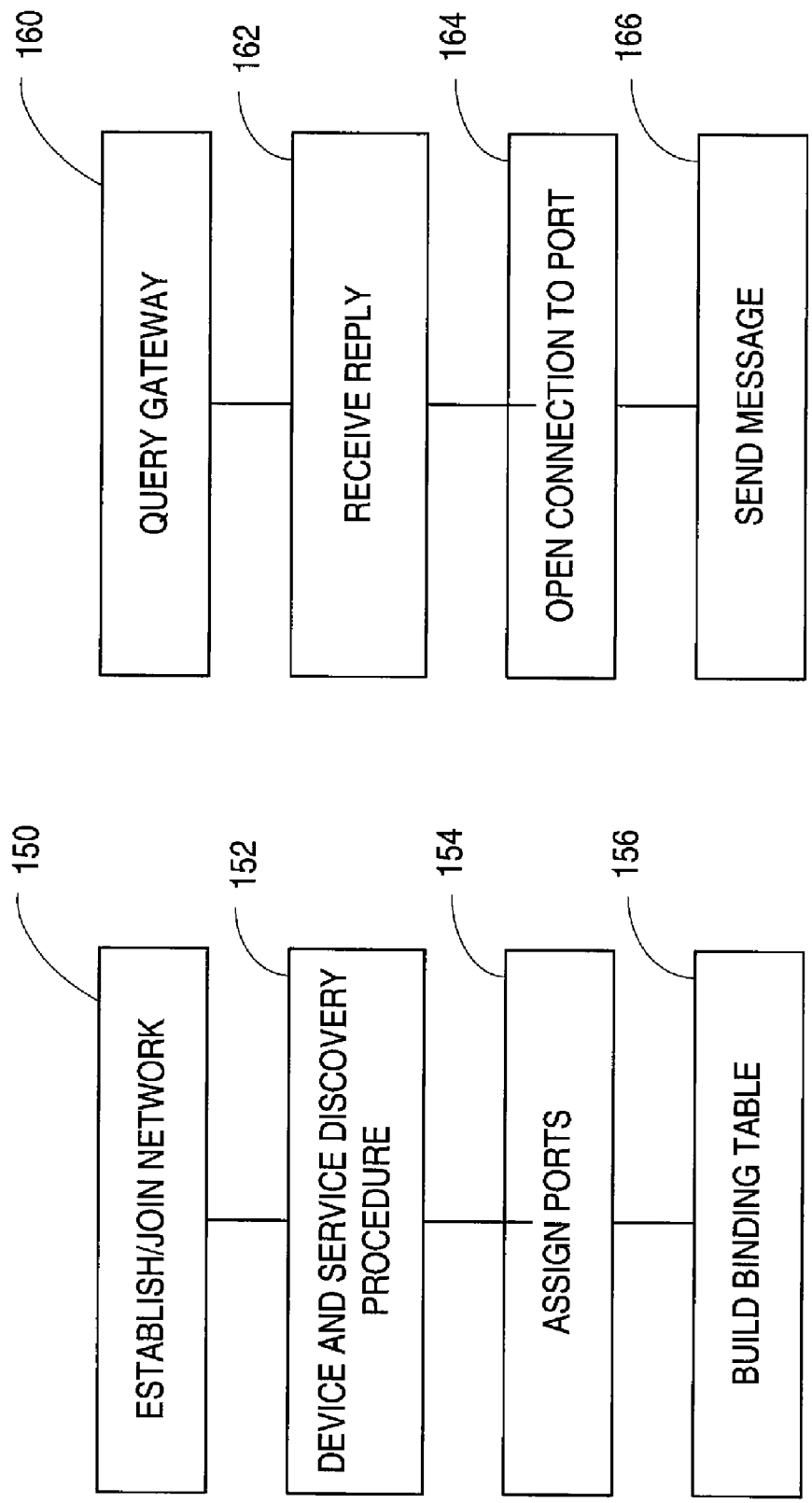
FIG. 7 illustrates a procedure for establishing the gateway.

An exemplary procedure for setting up the gateway 100 is shown in FIG. 7. First, gateway 100 either establishes or joins a Zigbee network 30 (block 150). The gateway 100 may function as the Zigbee coordinator or as a Zigbee router. After establishing or joining Zigbee network 30, the gateway 100 initiates device and service discovery procedures (block 152). The gateway 100 may provide full access to all of the devices and capabilities represented by the Zigbee network 30, or may provide access to a limited set of those devices and capabilities. Procedures for device and service discovery are specified by the Zigbee protocols. Following the device and service discovery procedures, gateway 100 assigns a port to each Zigbee client 32 (block 154) and builds the routing table 110 (block 156). Once the gateway 100 is operational, the gateway 100 may periodically query the Zigbee network 30 for new devices 32 and services and update the routing table 110. Devices 32 that are dropped from the network may be deleted.

Once gateway 100 is operating, an IP client 22 can establish a connection with a Zigbee client 32. Also, a Zigbee client 32 may initiate a connection with an IP client 22.

FIG. 7A illustrates an exemplary procedure implemented by an IP client 22 for connecting to a Zigbee client 32 in the Zigbee network 30. In this example, it is assumed that IP client 22 has no prior knowledge of the Zigbee clients 32 residing in the Zigbee network 30. It will be appreciated, however, that the IP client 22 could have a priori knowledge of the Zigbee client 32 through prior provisioning or prior communication. The IP client 22 queries gateway 100 for a list of Zigbee clients 32 matching a specified device type (block 160). For example, an IP client 22 for controlling home lighting may query the gateway 100 for Zigbee clients 32 that control lights (e.g., Device Type=LIGHT). Gateway 100 sends a reply to the query containing a list of compatible devices. The reply may also include information about the type and location of the lights. After receiving the reply (block 162), the IP client 22 can open connections to one or more ports associated with the Zigbee clients 32 that control lights (block 164). When the connection request is received at the gateway 100, the gateway 100 updates the routing table 110 to change the state of the corresponding port from "disconnected" to "connected". The IP client 22 can then send a message to the Zigbee client 32 (block 166). When a message or data is received at a port having a "connected" state, gateway 100 forwards the message or data to the corresponding client 32, which is identified by the MAC address or short address stored in the routing table 110. Once a connection is established between an IP client 22 and a Zigbee client 32, the Zigbee client 32 can also send messages and data back to the IP client 22. From the perspective of the Zigbee client 32, gateway 100 is the originator of, or destination of, messages and data. The Zigbee client 32 may also send messages to the Zigbee gateway 100. When the gateway 100 receives a message from a Zigbee client 32, the message is output to the port corresponding to the source address of the Zigbee client 32 if the port is in the connected state. If the port is not in the connected state, a NAK is sent to the originating Zigbee client 32 to indicate that the port is not active.

Figure 8:
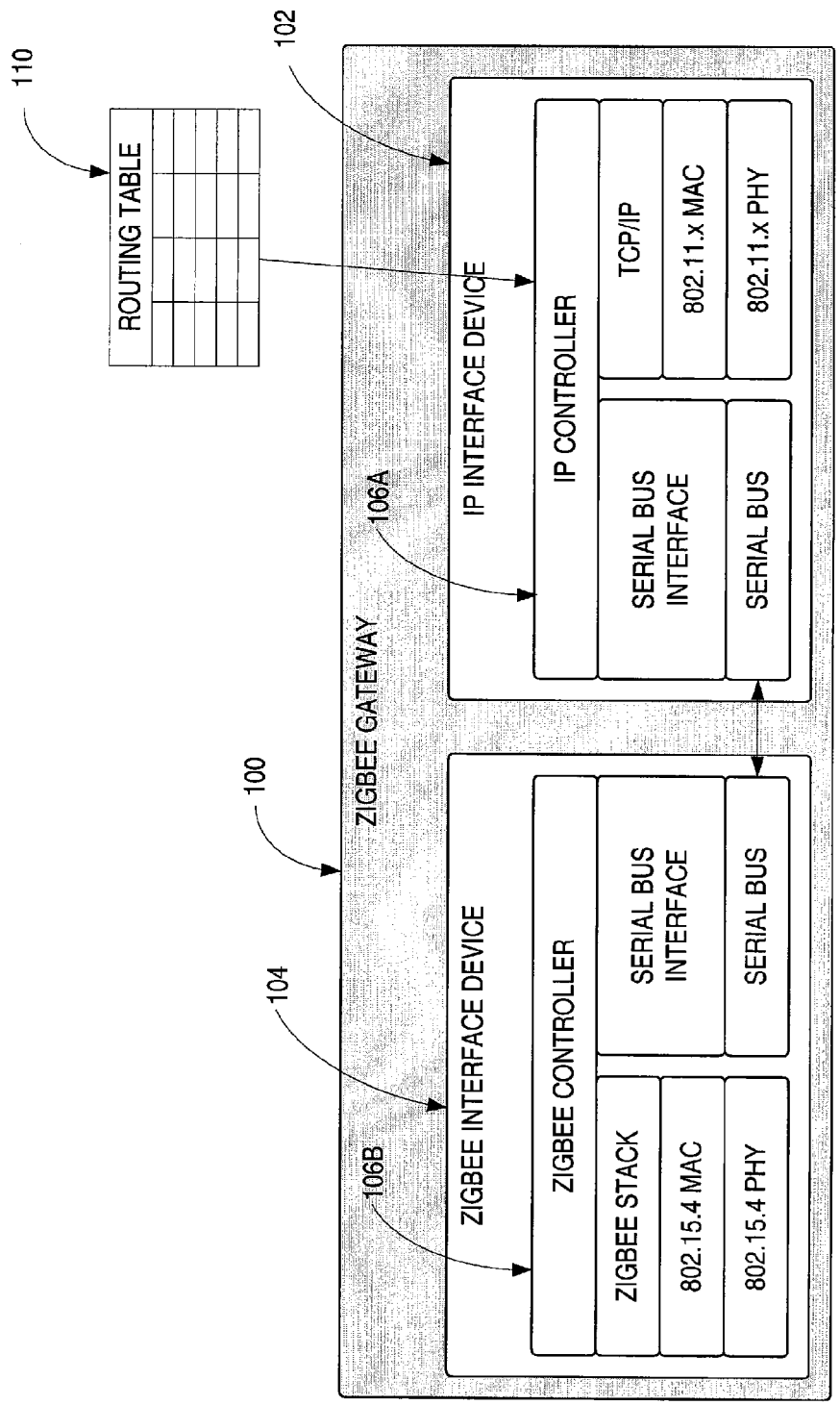
FIG. 8 illustrates an exemplary implementation of a gateway between a Zigbee personal area network and an IP network.

FIG. 8 illustrates an alternate embodiment of the gateway 100 in which the Zigbee stack and the TCP stack are implemented on different processors. In this embodiment, the IP interface device 102 and Zigbee interface device 104 each include a separate processor. The IP interface controller 106A resides on the IP interface device 102 and the Zigbee controller 106B resides on the Zigbee interface device 104. The Zigbee stack terminates at the Zigbee interface device 104, while the TCP stack terminates at the IP interface device 102. The IP and Zigbee interface devices 102,104 are connected by a serial bus to enable communication between the IP controller 106A and Zigbee controller 106B. A routing table 110 as previously described is maintained by the IP controller 106A.

A simple serial communication protocol is used to transfer data between the IP controller 106A and the Zigbee controller 106B. An exemplary message format for transfer of messages between the I P controller 106A and the Zigbee controller 106B is shown in FIG. 18. The message format includes a message type field, one or more message parameter fields, and a data field. The message type field indicates the type of the message. The message parameter fields provide required parameters for the message type. The data field contains the message data.

Exemplary message types include SEND, CONNECT/DISCONNECT, ACK/NACK. The SEND message is sent between the IP controller 106A and the Zigbee controller 106B to transfer message data. The CONNECT/DISCONNECT message is sent from the Zigbee controller 106B to the IP controller 106A to open or terminate a connection to a specified IP client 22. The ACK/NACK message is used to acknowledge a SEND or CONNECT/DISCONNECT messages. Other messages could also be defined.

The message parameters will vary depending on the message type. For example, message parameter fields for the SEND messages may include an ADDRESS element and DATA TYPE element. The ADDRESS element may contain the MAC address of an originating or terminating Zigbee client 32. For transmissions going from the Zigbee network 30 toward the IP network 20, this field would include the MAC address or short address of the originating Zigbee client 32. As described below, gateway 100 may use this address to determine the appropriate port to which the data is output. For communications from the IP network 20 toward the Zigbee network 30, the ADDRESS element may include the MAC address or short address of the terminating Zigbee client 32. The DATA TYPE element could be used to indicate the type of data, e.g., text, audio, video, binary, etc. being sent.

Figure 9:
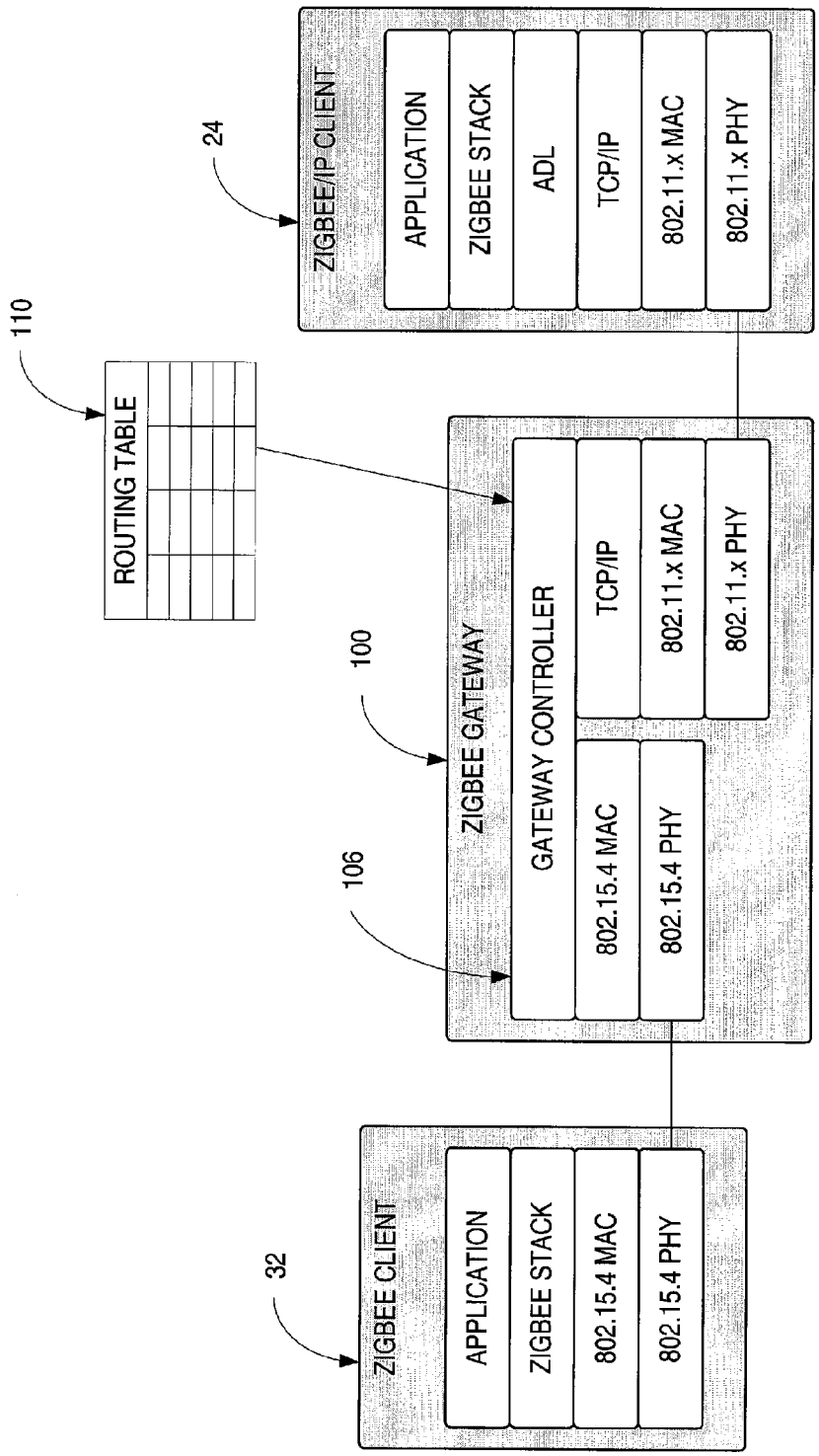
FIG. 9 illustrates an exemplary implementation of a gateway between a Zigbee personal area network and an IP network.

FIG. 9 illustrates a gateway that enables Zigbee/IP clients 24 to exist within the IP network 20. A Zigbee/IP client 24 is a device that implements the Zigbee stack over an IP stack. A Zigbee/IP client 24 can communicate using standard Zigbee protocols with Zigbee clients 32 in the Zigbee network 30. In contrast to the embodiment shown in FIG. 4, the gateway 100 does not terminate the Zigbee stack. Instead, the gateway 100 encapsulates Zigbee messages (including Zigbee headers) originated by a Zigbee client 32 within IP packets for transport over the IP network 20 to the Zigbee/IP client 24. The Zigbee/IP client 24 includes an adaptation layer (ADL) between the Zigbee stack and TCP/IP layer for decapsulating the encapsulated Zigbee messages in the received IP packets. In the reverse direction, the ADL encapsulates Zigbee messages and the gateway 100 decapsulates the Zigbee messages. Because the Zigbee stack is implemented by the Zigbee/IP client 24, the Zigbee/IP client 24 appears to the Zigbee network 30 like any other Zigbee client 32 once it has established a connection with the gateway 100 and joined the Zigbee network 30. When the Zigbee/IP client 24 joins the Zigbee network 30, the gateway 100 adds the Zigbee/IP client 24 to the routing table 110 and assigns a port to the Zigbee/IP client 24 the same as any other Zigbee client 32. Zigbee clients 32 in the Zigbee network 30 will be able to recognize and communicate with the Zigbee/IP client 24 the same as any other Zigbee client 32. The Zigbee/I P client 24 will also be discoverable using standard Zigbee discovery methods. With the embodiment shown in FIG. 9, applications written for a standard Zigbee client 32 can also be used by a Zigbee/IP client 24.

Gateway 100 may be used to facilitate communications between a standard Zigbee client 32 and an IP Multimedia Subsystem (IMS) client 40 residing in the IP network 20. The IMS client 40 is a software application residing on a host computer connected to the IP network 20. The IMS client 40 implements the Session Initiation Protocol (SIP). An IMS aware application residing on a Zigbee client 32 could generate IMS and/or SIIP messages and use the Zigbee protocols to send the IMS and/or SIP messages to the gateway 100 encapsulated within standard Zigbee messages. In this case, gateway 100 may simply forward the encapsulated IMS and/or SIP message to the final destination. However, IMS and SIP messages are generally large and the connection between the gateway 100 and the IP network may be expensive and/or unrealizable. Therefore, it may not be desirable to send IMS and SIP messages over the interface between gateway 100 and IP network 20.

Figure 10:
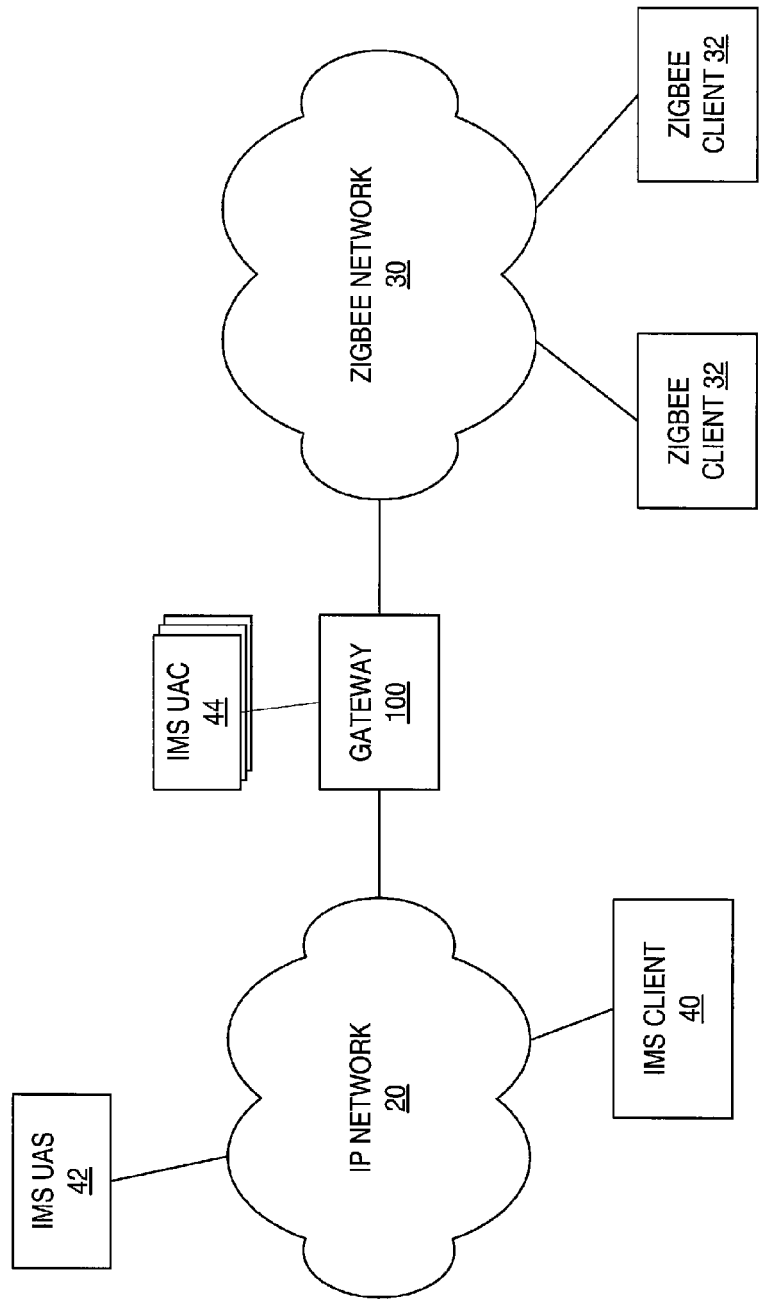
FIG. 10 illustrates an exemplary communication network including an IP network and a Zigbee personal area network.

In the embodiment shown in FIG. 10, an IMS aware application residing on the Zigbee client 32 communicates with an IMS user agent server 42 connected to the IP network 20. A user agent client (UAC) 44 residing on the gateway 100 is used to communicate with the UAS 42. A separate UAC 44 is instantiated for each Zigbee client 32 having a connection to the UAS 42. The IMS aware application residing on a Zigbee client 32 can remotely control the IMS client 40 and participate in IMS transactions. U.S. patent application Ser. No. 11/114,427 filed 40 April 2005 and entitled "Media Client Architecture for Networked Communication Devices" describes a user agent having a high level application interface for remote communication with an application, which may function as the user agent server 42 in the present invention. This application is incorporated herein by reference. By locating the IMS client 40 in IP network 20, fewer messages will need to traverse the gateway 100. Further, messages sent between the application residing on the Zigbee client 32 and the IMS client 40 may be sent in binary form rather than as text greatly reducing the size of the messages. Thus, the data transmitted over the gateway 100 can be significantly reduced.

Figure 11:
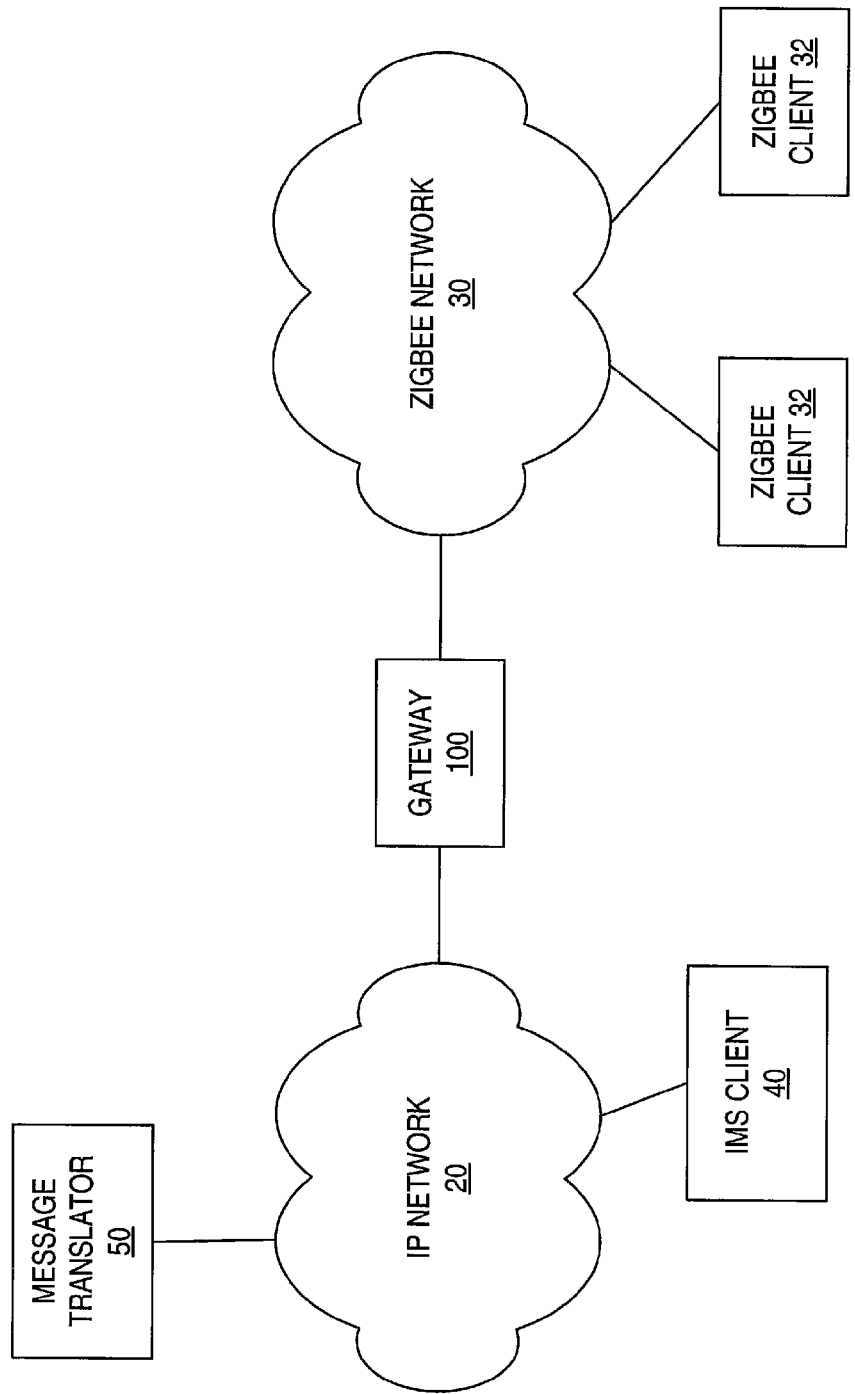
FIG. 11 illustrates an exemplary communication network including an IP network and a Zigbee personal area network.

There may be instances where it is desirable for an IMS client 40 to communicate with an industry standard Zigbee application that lacks awareness of the IMS. Such communications can be facilitated through the use of a message translator 50 as shown in FIG. 11. The message translator 50 functions as a SIP proxy server that also provides message translation services. While the message translator 50 is shown in FIG. 11 as being connected to the IP network 20, those skilled in the art will appreciate that the message translation function could be implemented by a message translator 50 located at gateway 100.

Figure 12:
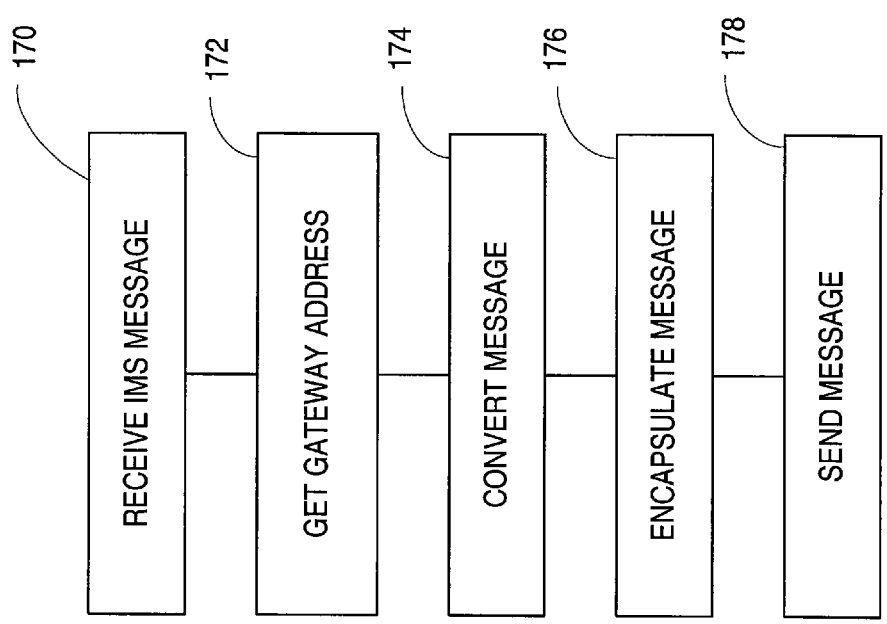
FIG. 12 illustrates a procedure for translating IMS messages into Zigbee messages.

To provide an example, assume that an IMS client 40 wants to gather information from one or more Zigbee light sensors that operate according to the Home Control, Lighting profile. It is presumed that the light sensor has been assigned a SIP username and that the SIP username has been registered with a SIP registrar. FIG. 12 illustrates an exemplary procedure implemented by the message translator 50. The message translator 50 receives a SUBSCRIBE message from the IMS client 40 (step 170). The SUBSCRIBE message includes the SIP URI for light sensor in the Zigbee network 30. Upon receipt of the message, message translator 50 obtains the IP address and port of gateway 100 from the SIP registrar in a conventional manner using the SIP username provided by the IMS client 40 (step 172). Message translator 50 then converts the message into a standard Zigbee message (step 174), encapsulates the message in one or more IP packets (step 176), and forwards the IP packets to gateway 100 (step 178). The gateway 100 extracts the encapsulated Zigbee messages from the IP packets and forwards the encapsulated Zigbee message to the Zigbee client 32 controlling the light sensor as previously described.

Figure 13:
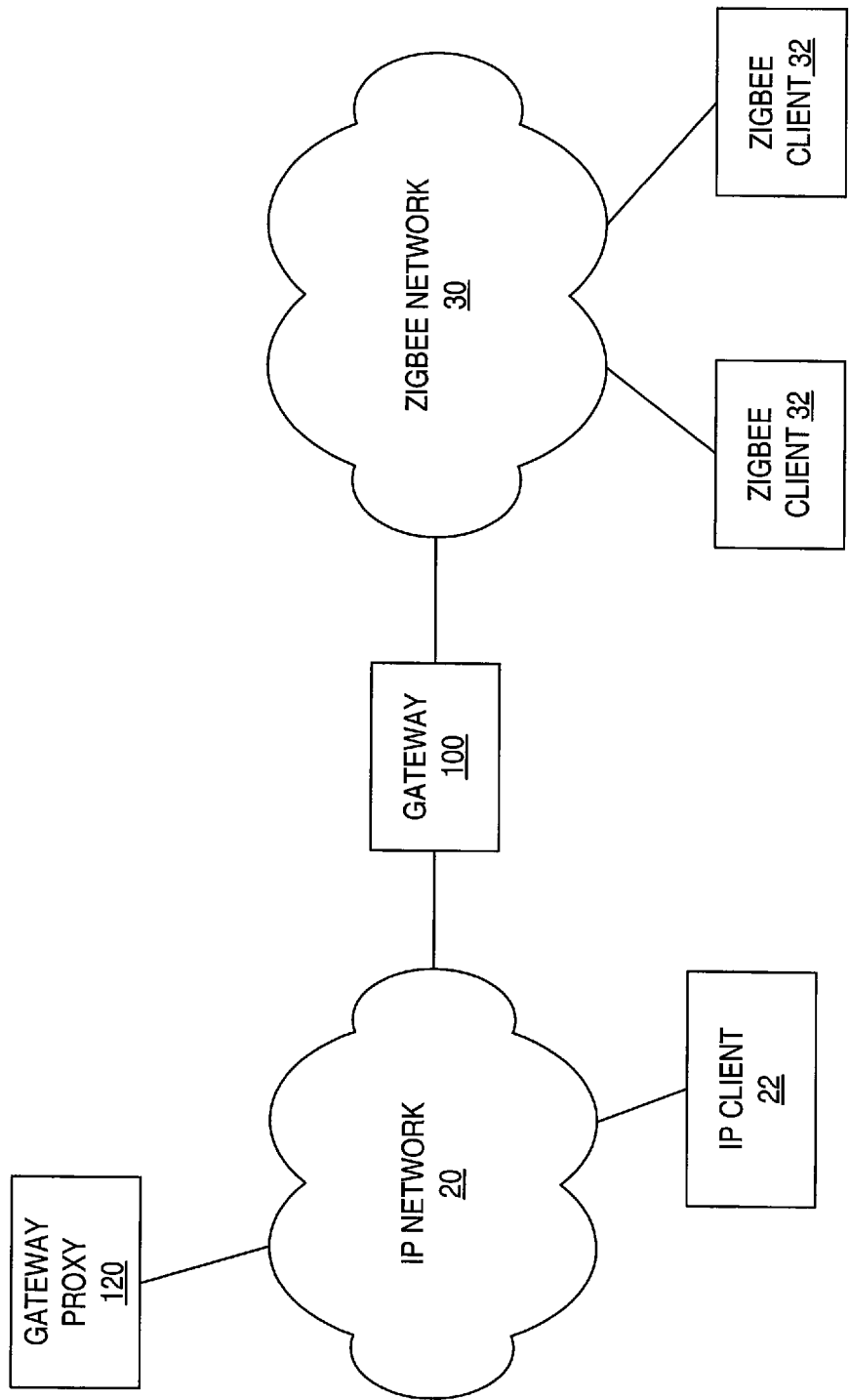
FIG. 13 illustrates an exemplary communication network including an IP network and a Zigbee personal area network.

FIG. 13 illustrates an embodiment that uses a gateway proxy 120 connected to the IP network 20 to communicate with IP clients 22. A gateway proxy 120 may be useful where the link between the gateway 100 and the IP network 20 is expensive and/or unreliable, so it is undesirable or impractical to maintain a continuous connection with the gateway 100. While the gateway proxy 120 is physically separate from the gateway 100, it may logically be considered part of the gateway 100. In this embodiment, the task of maintaining connections with IP clients 22 is moved from the gateway 100 to the gateway proxy 120. A multiplexing communication link connects the gateway 100 with the gateway proxy 120. The gateway proxy 120 could also function as a message translator 50 to translate between Zigbee and IMS message formats. The gateway proxy 120 may be implemented as a software application residing on a server connected to the IP network 20.

The primary functions of the IP controller 106A at the gateway 100 is to connect with the gateway proxy 120 and to forward messages between Zigbee clients 32 and the gateway proxy 120. The gateway proxy 120 assigns ports to Zigbee clients 32 and maintains a routing table 110 as previously described. IP clients 22 that want to communicate with a Zigbee client 32 connect to the gateway proxy 120. The use of a gateway proxy 120 as shown in FIG. 13 allows gateway 100 to be implemented in a low power wireless device with little memory. The gateway proxy 120 can have a larger memory and more power. Gateway proxy 120 can buffer data and maintain links with IP clients 22 even when the link with the gateway 100 is interrupted. Similarly, gateway 100 can buffer data when the link with the gateway proxy 120 is interrupted.

Figure 14:
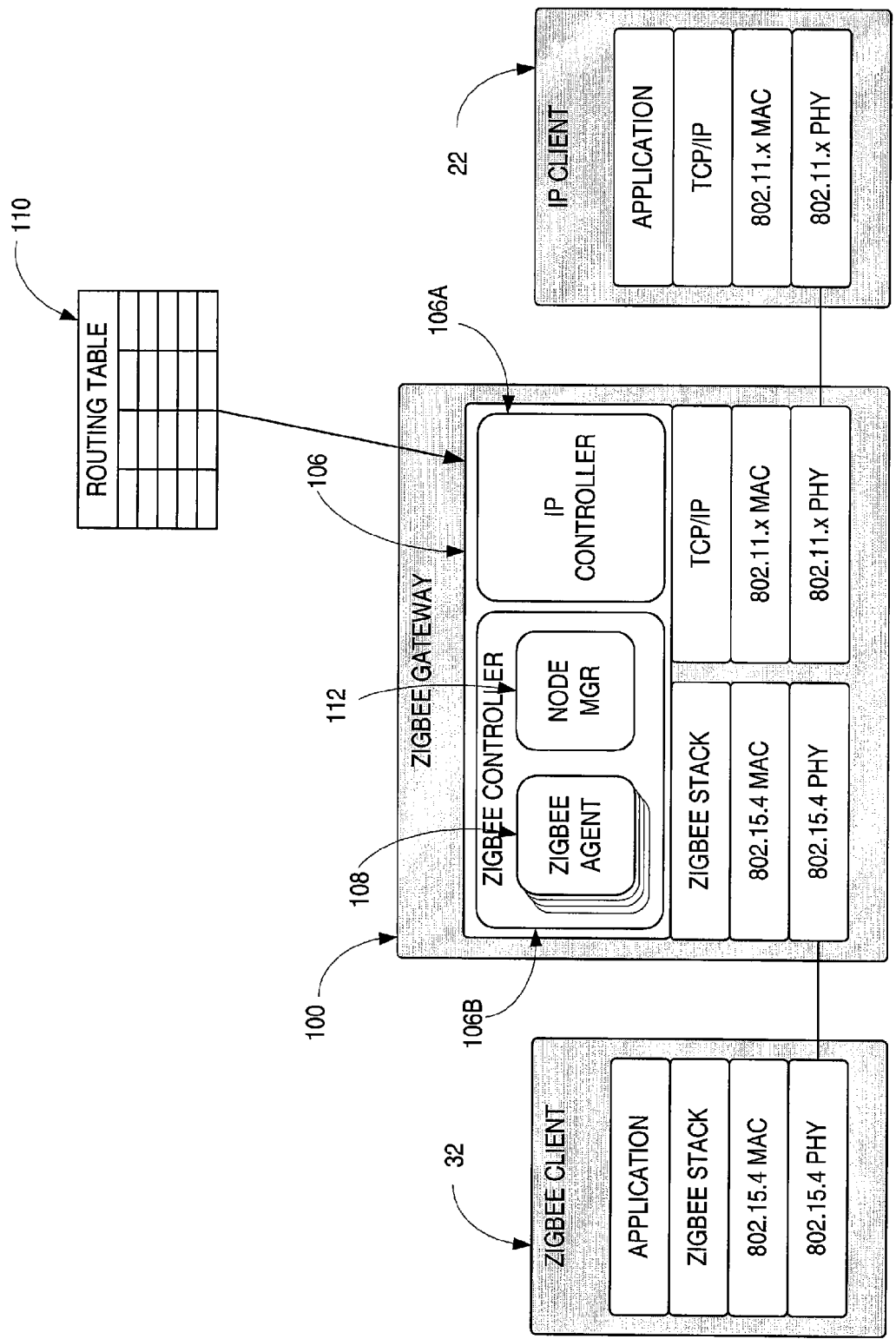
FIG. 14 illustrates an exemplary implementation of a gateway between a Zigbee personal area network and an IP network.

FIG. 14 illustrates an embodiment that allows communication between Zigbee clients 32 and I P clients 22 using Zigbee agents 108. Zigbee agents 108 comprise Zigbee applications defined by a standard Zigbee application profile that reside on the gateway 100. Zigbee agents 108 can be remotely configured by IP clients 22 and can join the Zigbee network 30 to perform tasks under the direction and control of the IP client 22. The use of Zigbee agents 108 enables IP clients 22 to interact with industry standard Zigbee applications that lack awareness of the IP network 20.

As an example, assume that an IP client 22 desires to monitor a light sensor in the Zigbee network 30. The IP client 22 may connect to the gateway 100 and request that a Zigbee agent 108 be created to monitor the light sensor. In this example, the gateway 100 would create a Zigbee agent 108 having a Profile ID and Cluster ID that enables binding with the light sensor. The Zigbee agent 108 may receive light sensor readings from the standard Zigbee light sensor and forward those readings to the IP client 22. The Zigbee light sensor does not need any special capabilities.

To implement the Zigbee agents 108, Zigbee controller 106B includes a node manager 112 to instantiate the Zigbee agents 108. Node manager 112 may be assigned a dedicated port on the gateway 100 for communicating directly with I P clients 22. Each Zigbee agent 108 is assigned a unique port that is stored in the routing table 110. An IP client 22 may send a request to the node manager 112 to create a Zigbee agent 108. When a Zigbee agent 108 is instantiated by the node manager 112, the Zigbee agent 108 requests the IP controller 106A to assign a port to the Zigbee agent 108 and to add an entry to the routing table 110 associating the Zigbee agent 108 with the corresponding port. The I P controller 106A returns the assigned port to the node manager 112, which informs the IP client 22. Alternatively, IP controller 106A could send a message directly to the IP client 22 after assigning the port. Once the Zigbee agent 108 is instantiated and a port is assigned, the IP client 22 can communicate directly with the Zigbee agent 108 using the designated port. Gateway 100 handles communications between Zigbee agents 108 and IP clients 22 the same as Zigbee clients 32.

Figure 15:
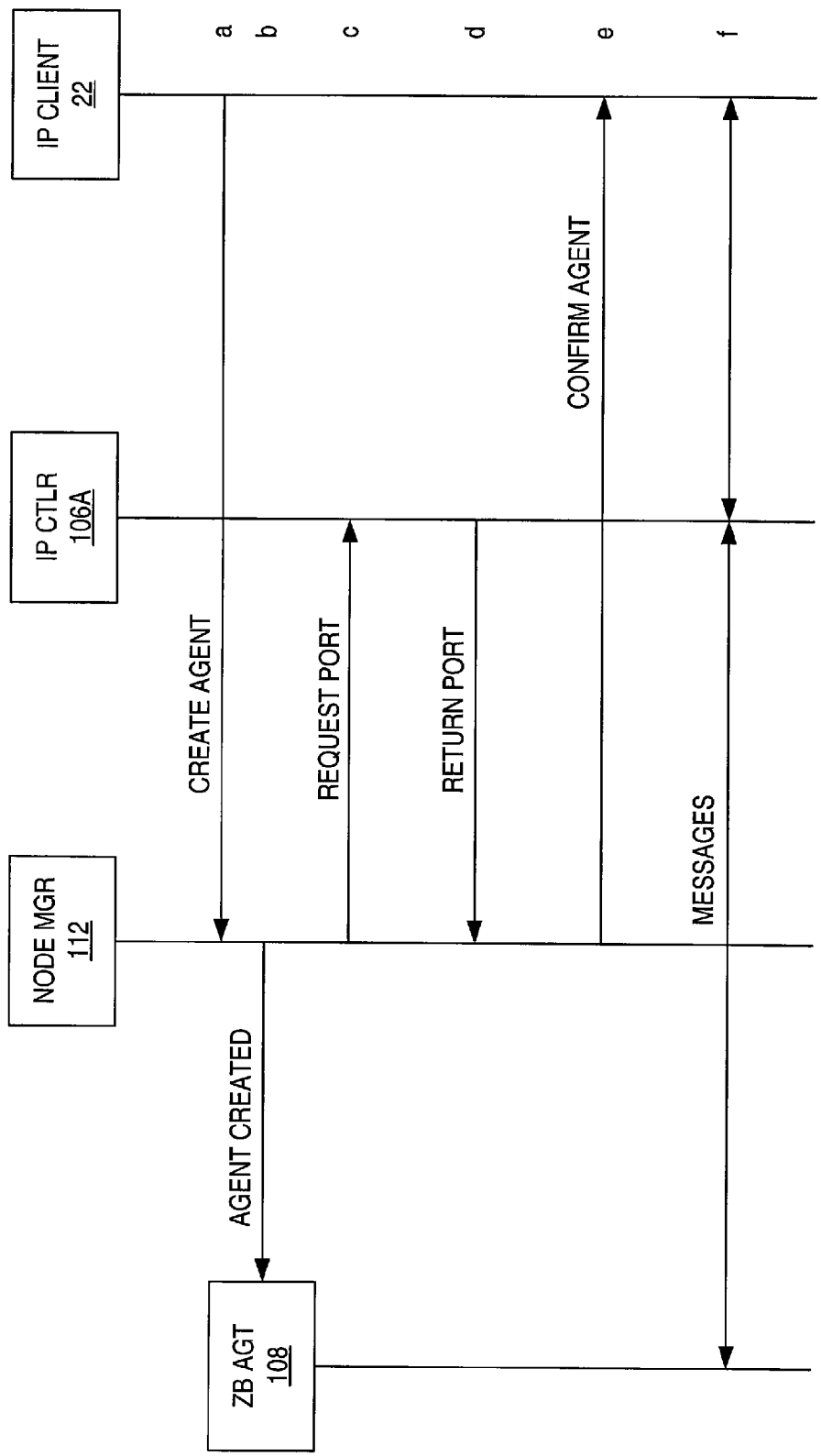
FIG. 15 illustrates a procedure for creating Zigbee agents on a gateway.

FIG. 15 illustrates an exemplary procedure for establishing a Zigbee agent 108 on the gateway 100. An IP client 22 sends a request to create a Zigbee agent 108 to the node manager 112 (step a). The request includes parameters defining the type of agent 108 to be created. For example, the request may include a standard profile ID and/or cluster ID corresponding to a standard Zigbee application profile. The request may also specify other Zigbee applications in the Zigbee network 30 to which the Zigbee agent 108 should be bound. In response to the request, node manager 112 instantiates the Zigbee agent 108 as specified by the request and initiates binding of the Zigbee agent 108 with one or more other Zigbee applications in the Zigbee network 30 (step b). The node manager 112 also sends a request to the IP controller 106A for a port assignment (step c). The IP controller 106A assigns a port to the newly-created Zigbee agent 108 and returns the assigned port to the node manager 112 (step d). The node manager 112 responds to the IP client 22 confirming creation of the Zigbee agent 108 and providing the IP client 22 with the assigned port for the Zigbee agent 108 (step e) The IP client 22 and Zigbee agent 108 can then communicate using the services of the IP controller 106A (step f).

Figure 16:
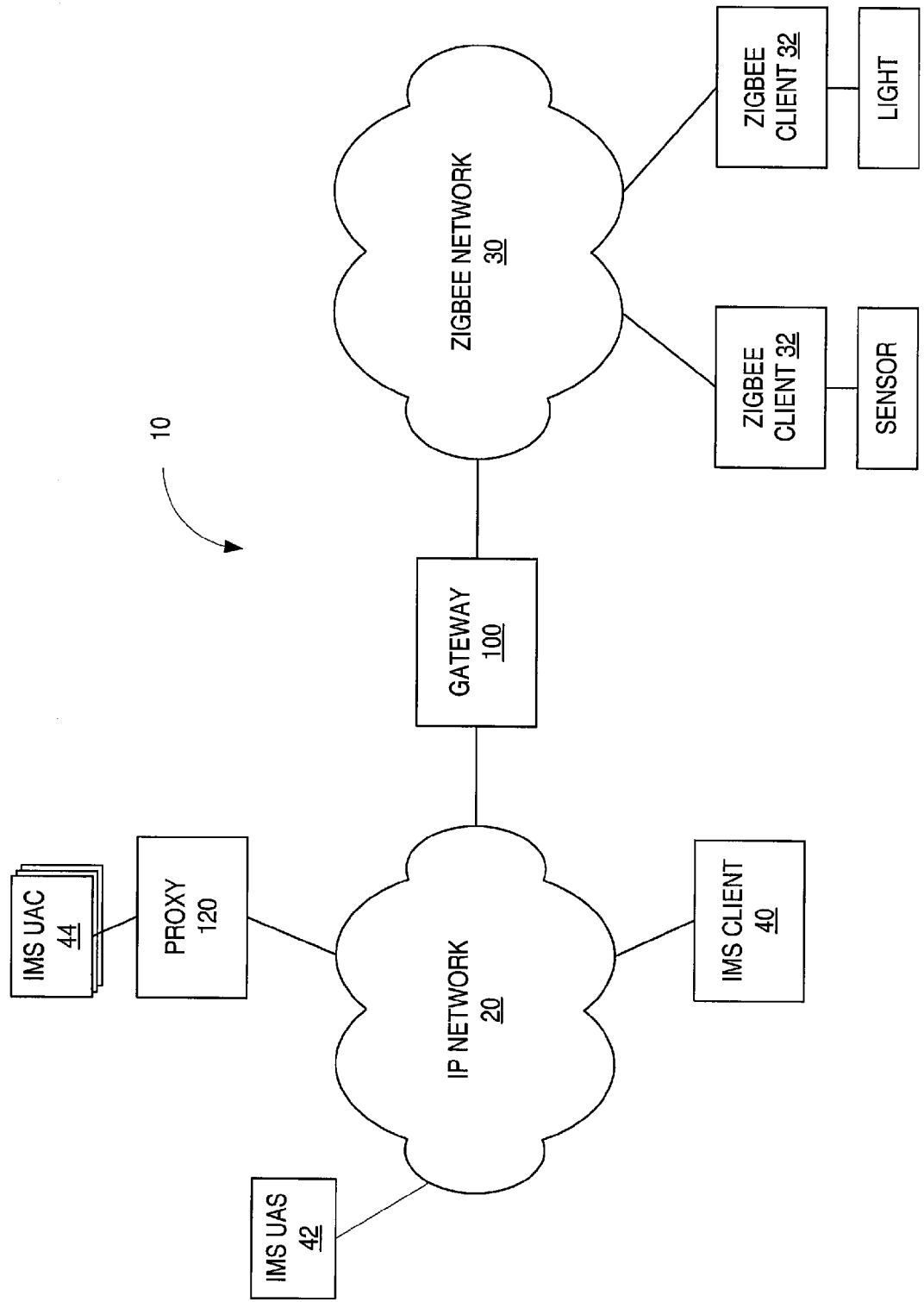
FIG. 16 illustrates an exemplary communication network including an IP network and a Zigbee personal area network.

FIG. 16 illustrates an embodiment that combines elements from previous embodiments. This embodiment includes a gateway 100 as shown in FIG. 13, a proxy 120, and a user agent server (UAS) 42. The proxy 120 in this embodiment includes one or more IMS user agent clients 44 that are used to establish connections with the UAS 42 on behalf of IMS aware Zigbee clients 32. A separate IMS user client (UAC) 44 is created for each IMS aware Zigbee clients 32. The proxy 120 also has a UAC 44. The gateway 100 includes a node manager 112 for instantiating Zigbee agents 108 as previously described. Both the gateway 100 and proxy 120 can buffer data traffic if either end is unable receive data or the IP link connecting the gateway 100 with the IP network 20 is interrupted. This embodiment of the gateway 100 allows communication between IMS clients 40 and both IMS aware and IMS unaware Zigbee clients 32.

Figure 17:
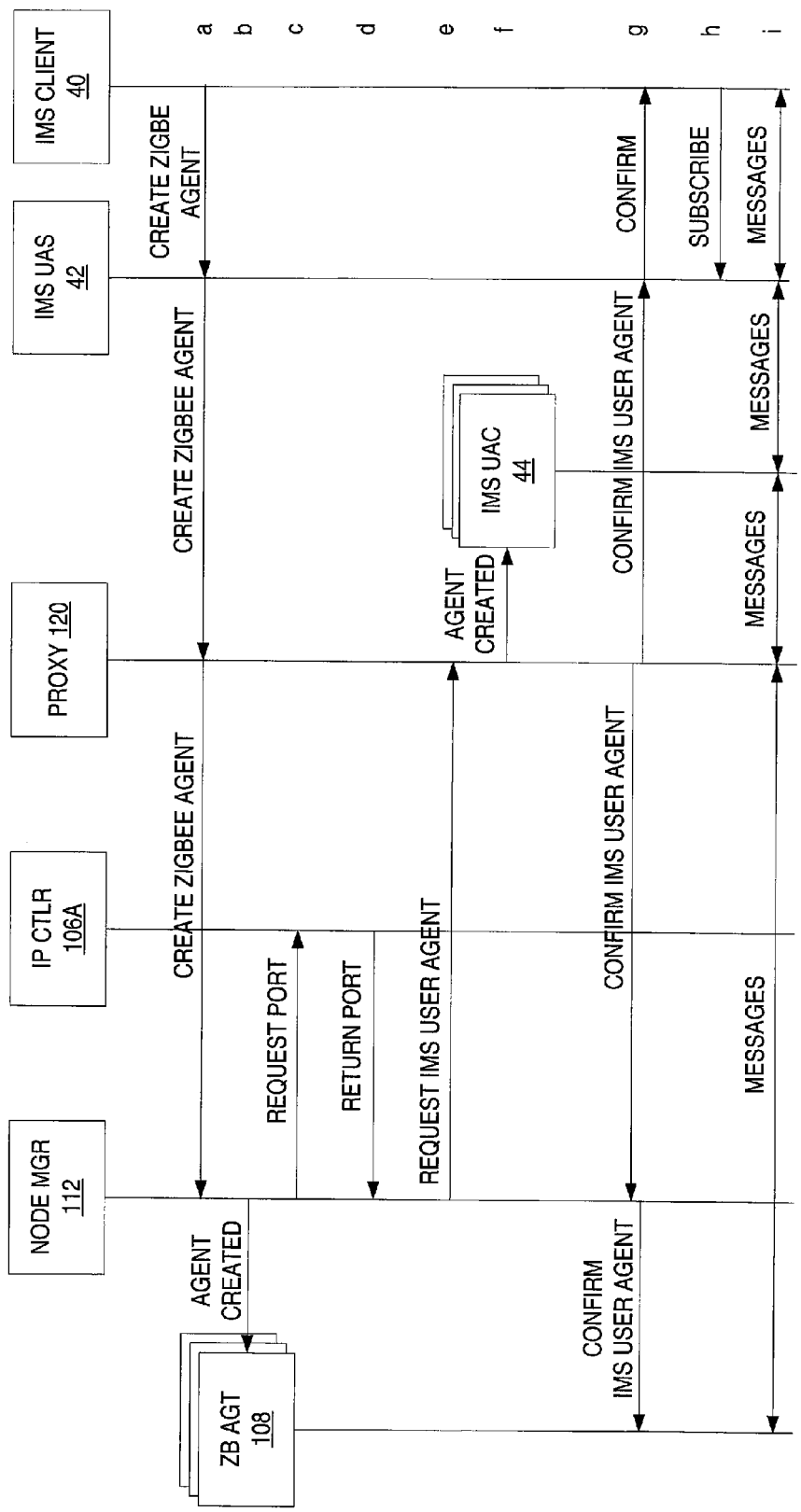
FIG. 17 illustrates a procedure for creating Zigbee agents on a gateway.

FIG. 17 illustrates an exemplary procedure for establishing communications between an IMS client 40 and an IMS unaware Zigbee client 32. An IMS client 40 sends a request to create a Zigbee agent 108 to the node manager 112 (step a). The request includes parameters defining the type of agent 108 to be created. For example, the request may include a standard profile ID and/or cluster ID corresponding to a standard Zigbee application profile. The request may also specify other Zigbee applications in the Zigbee network 30 to which the Zigbee agent 108 should be bound. In response to the request, node manager 112 instantiates the Zigbee agent 108 as specified by the request and initiates binding of the Zigbee agent 108 with one or more other Zigbee applications in the Zigbee network 30 (step b). The node manager 112 also sends a request to the IP controller 106A for a port assignment (step c). The IP controller 106A assigns a port to the newly-created Zigbee agent 108 and returns the assigned port to the node manager 112 (step d). The node manager 112 sends a request to the proxy 120 to create or assign an IMS user agent client 44 to be paired with the newly created Zigbee agent (step e). The proxy assigns or creates an IMS user agent client 44 (step f) and sends confirmation of the IMS user agent client 44 to both the IMS client 40 initiating the transaction and to the node manager 112 (step g). The node manager 112 forwards the confirmation to the Zigbee agent 108. The confirmation includes the URI for the new IMS user agent along with the event name or event ID and MIME type that will be used for all STATE commands sent from the new Zigbee agent. The IMS client 40 may now subscribe to events associated with the new Zigbee agent 108 by sending a SUBSCRIBE request to the IMS user agent server 42 with the URI, event ID or event name, and MIME Type received in the confirmation from the proxy 120 (step h). All Zigbee messages received by the Zigbee agent 108 on the bound cluster ID are embedded in an IMS STATE command message and sent to proxy 120 where the messages are formatted into an IMS UA STATE message. The message is then forwarded to the IMS client 40 through the IMS user agent client 44 and IMS user agent server 42 (step i). In other embodiments, the UAC 44 could be set up to forward messages from the Zigbee agent 108 directly to the IMS client 40. The IMS client 40 may also send Zigbee MSG and KVP messages to any Zigbee client 32 on the Zigbee network 30 using the IMS MSG method. The Zigbee message is encapsulated within an IMS MSG request and sent to the Zigbee agent 108 on the gateway 100.

Those skilled in the art will appreciate that the techniques described above for establishing communication between a Zigbee agent 108 and IMS client 40 could be used with standard SIP methods other than the SUBSCRIBE method.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of transmitting messages between a personal area network (PAN) and an Internet Protocol (IP) network, said method comprising:
   allocating ports on an IP interface to one or more PAN clients in said PAN;
   storing a routing table in memory for relating said PAN clients in said PAN with their corresponding ports, the routing table including therein an indication of the device types of said PAN clients; and
   routing messages between said PAN clients and said IP network based on said routing table, by:
      receiving from said IP network a query for a list of PAN clients that have a certain device type indicated in said routing table and their corresponding ports;
      sending said list to said IP network responsive to said query; and
      receiving a message at a port corresponding to one of said PAN clients in said list and routing the message to that PAN client based on the routing table.

2. The method of claim 1 wherein the device types of said PAN clients indicate one or more types of devices that are controlled by said PAN clients.

3. The method of claim 1 further comprising sending device locations associated with the one or more PAN clients to said IP network responsive to said query.

4. The method of claim 1 further comprising opening connections between the IP network and one or more ports corresponding to the one or more PAN clients that have said certain device type indicated in said routing table.

5. The method of claim 1 wherein said routing table includes multiple entries for a given one of said PAN clients, each of the multiple entries indicating a different device type of that given PAN client.

6. A gateway for connecting a personal area network (PAN) with an Internet Protocol (IP) network, said gateway comprising:
    a PAN interface for connecting to said PAN;
    an IP interface for connecting to said IP network, said IP interface including one or more ports;
    a gateway controller for assigning ports on said IP interface to respective clients in said PAN; and
    memory for storing routing information associating said clients in said PAN with corresponding ports on said IP interface, the routing information including an indication of the device types of said clients in said PAN;
    wherein the gateway controller is configured to route data between said clients in said PAN and said IP network based on said routing table, by:
        receiving from said IP network a query for a list of PAN clients that have a certain device type indicated in said routing table and their corresponding ports;
        sending said list to said IP network responsive to said query; and
        receiving a message at a port corresponding to one of said PAN clients in said list and routing the message to that PAN client based on the routing table.

7. The gateway of claim 6 wherein the device types of said PAN clients indicate one or more types of devices that are controlled by said PAN clients.

8. The gateway of claim 6 wherein said gateway controller is further configured to send device locations associated with the one or more PAN clients to said IP network responsive to said query.

9. The gateway of claim 6 wherein said gateway controller is further configured to open connections between the IP network and one or more ports corresponding to the one or more PAN clients that have said certain device type indicated in said routing table.

10. A method of communicating between one or more clients in a personal area network (PAN) and an IP client located external to said PAN, said method comprising:
    receiving a message from the IP client that includes one or more parameters pertaining to configuration of a PAN agent on said PAN;
    creating a PAN agent on said PAN that is configured, in accordance with said one or more parameters, to communicate with one or more clients in said PAN under the direction of said IP client and according to PAN protocols, to thereby establish the presence of said IP client within said PAN; and
    communicating between said one or more clients in said PAN and said IP client through said PAN agent.

11. The method of claim 10 wherein said PAN agent resides on a gateway.

12. The method of claim 10 wherein said PAN is a Zigbee network.

13. The method of claim 10 wherein creating a PAN agent on said PAN further comprises creating a user agent for said PAN agent in the IP network.

14. The method of claim 13 wherein said user agent comprises an IP Multimedia Subsystem (IMS) user agent.

15. The method of claim 13 wherein communicating with said client in said PAN through said PAN agent comprises communicating with said user agent.

16. The method of claim 10, wherein said PAN agent communicates with said one or more clients in said PAN under the direction of said IP client and according to PAN protocols, to thereby relieve said one or more clients in said PAN of having to communicate with said IP client according to IP protocols.

17. The method of claim 10 wherein said creating comprises creating said PAN agent responsive to receiving a request for said creation from said IP client.

18. The method of claim 17 wherein said request includes one or more parameters defining the type of PAN agent to be created.

19. The method of claim 18 wherein said PAN comprises a Zigbee network and wherein said one or more parameters include a Zigbee profile ID.

20. A gateway for connecting a personal area network (PAN) with an Internet Protocol (IP) network located external to said PAN, said gateway comprising:
    a first interface device for connecting to one or more clients in said PAN;
    a second interface device for connecting to an IP client in said IP network and for receiving a message from the IP client that includes one or more parameters pertaining to configuration of a PAN agent on said PAN; and
    a gateway controller including a node manager for creating a PAN agent on said PAN that is configured, in accordance with said one or more parameters, to communicate with the one or more clients in said PAN under the direction of said IP client and according to PAN protocols, to thereby establish the presence of said IP client within said PAN.

21. The gateway of claim 20 wherein said node manager is configured to create said PAN agent responsive to a request from said IP client received over said second interface.

22. The gateway of claim 21 wherein said request includes said one or more parameters defining the type of PAN agent to be created.

23. The gateway of claim 22 wherein said PAN comprises a Zigbee network and wherein said one or more parameters include a Zigbee profile ID.

24. The gateway of claim 21 wherein said node manager configures said PAN agent to communicate with a user agent in said IP network, and wherein said IP client communicates with said PAN agent through said user agent.

25. The gateway of claim 24 wherein said user agent comprises an IP Multimedia Subsystem (IMS) user agent for communicating with IMS clients.

26. The gateway of claim 20, wherein said PAN agent communicates with said one or more clients in said PAN under the direction of said IP client and according to PAN protocols, to thereby relieve said one or more clients in said PAN of having to communicate with said IP client according to IP protocols.

* * * * *